United States Patent
Doerr et al.

(10) Patent No.: US 7,610,827 B2
(45) Date of Patent: Nov. 3, 2009

(54) ADJUSTING DEVICE FOR A TRANSMISSION

(75) Inventors: Wolfgang Doerr, Eichenau (DE); Zoltán Skriba, Budapest (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/020,323

(22) Filed: Jan. 25, 2008

(65) Prior Publication Data

US 2008/0236323 A1    Oct. 2, 2008

Related U.S. Application Data

(63) Continuation of application No. PCT/EP2006/007314, filed on Jul. 25, 2006.

(30) Foreign Application Priority Data

Jul. 26, 2005    (DE) .................. 10 2005 034 865

(51) Int. Cl.
  *F16H 59/00*  (2006.01)
  *B60Q 1/00*   (2006.01)
  *G06F 7/00*   (2006.01)
(52) U.S. Cl. ................. 74/335; 340/456; 701/64
(58) Field of Classification Search ............ 74/335, 74/473.36, 473.1, 471 XY; 701/64; 340/456
See application file for complete search history.

(56) References Cited

U.S. PATENT DOCUMENTS

| | | | |
|---|---|---|---|
| 5,566,579 A * | 10/1996 | Willford et al. ............ 74/335 |
| 5,893,293 A * | 4/1999 | Earp ...................... 74/335 |
| 6,370,980 B1 * | 4/2002 | Olsson et al. ............ 74/473.24 |
| 6,397,696 B2 * | 6/2002 | Ogami .................... 74/335 |
| 6,457,376 B1 | 10/2002 | Tischer | |
| 6,722,219 B2 | 4/2004 | Berger et al. | |
| 6,730,864 B2 * | 5/2004 | Hillebrand et al. ....... 200/61.88 |
| 7,246,862 B2 | 7/2007 | Duchet et al. | |
| 2002/0029645 A1 * | 3/2002 | Jackson et al. ............ 74/335 |
| 2008/0264191 A1 * | 10/2008 | Doerr et al. ............ 74/337.5 |

FOREIGN PATENT DOCUMENTS

| DE | 26 46 393 B2 | 4/1978 |
|---|---|---|
| DE | 2646393 A * | 4/1978 |
| DE | 42 08 888 A1 | 9/1993 |

(Continued)

OTHER PUBLICATIONS

International Search Report dated Nov. 29, 2006 w/English translation (six (6) pages).

(Continued)

*Primary Examiner*—Roger Pang
(74) *Attorney, Agent, or Firm*—Crowell & Moring LLP

(57) ABSTRACT

An adjusting device for a transmission, such as a motor vehicle transmission is described. The transmission has at least one moveable adjusting element, at least two sensors for detecting a position of the at least one moveable adjusting element, and a code path of the at least one moveable adjusting element having sections of different heights which are provided to be scanned by the at least two sensors, the sections of the code path of different heights being arranged at least two-dimensionally. The at least two sensors are arranged parallel to one another.

19 Claims, 4 Drawing Sheets

FOREIGN PATENT DOCUMENTS

| | | |
|---|---|---|
| DE | 44 34 003 A1 | 4/1995 |
| DE | 100 32 907 A1 | 2/2001 |
| EP | 1 063 450 A1 | 12/2000 |
| FR | 2 707 360 A1 | 1/1995 |
| WO | WO 01/02753 A1 | 1/2001 |
| WO | WO 03/008250 A2 | 1/2003 |

OTHER PUBLICATIONS

German Office Action dated Feb. 28, 2008 including English translation (six (6) pages).
German Office Action dated Mar. 18, 2008 (threee (3) pages).
Translation of The International Preliminary Report on Patentability dated Jun. 19, 2008. (Eight (8) pages).

* cited by examiner

ADJUSTING DEVICE FOR A TRANSMISSION

CROSS REFERENCE TO RELATED APPLICATIONS

This application is a continuation of international patent application number PCT/EP2006/007314, filed Jul. 25, 2006, designating the United States of America, the entire disclosure of which is incorporated herein by reference. Priority is claimed based on German patent application Ser. No. 10/2005/034865.3, filed Jul. 26, 2005.

BACKGROUND AND SUMMARY OF THE INVENTION

The present invention relates to an adjusting device for a transmission, in particular for a motor vehicle transmission, with at least one moveable adjusting element, the position of which is detected by at least one sensor, wherein a code path is provided which has sections of different heights which are provided to be scanned by the sensor.

Speed converters and also speed-torque converters and components thereof are, in this context, referred to by the term "transmission". In particular motor vehicle main transmissions, clutches, etc. are to be covered by said term.

For controlling of transmissions of this type, input signals, produced, for example, by an operator or a controller, are converted into a mechanical movement of parts of the transmission. For example, during a change of gear speed or transmission ratio of a motor vehicle transmission, a selection and a shifting direction can be detected, can first be converted into movements of a selector lever and of a shift lever and then corresponding parts of the transmission can be moved. Conversely, the movements or positions, for example of the selector lever and shift lever, and the further part of the transmission, such as, for example, the position of the shift forks have to be sensed.

According to the prior art, displacement sensors are used for the controlling of vehicle transmissions. The displacement sensors usually have a linearly moveable pin. In this case, the sensor pin is coupled, for example, to the shift shaft in such a manner that a translatory movement of the shift fork leads to a linear movement of the sensor pin. The sensor is usually arranged in the lower oil chamber of the transmission and therefore exposed to high temperature and media loadings. For this reason, use is usually made of inductive displacement sensors which are very robust. In the case of these inductive sensors, the sensor pin moves in the interior of a coil. A movement, for example, of the shift shaft brings about a movement of the sensor pin which, in turn, causes a change in inductance in the coil. In addition to the displacement sensor design which has to be robust and costly because of the environmental conditions, solutions of the prior art give rise to further disadvantages. If there are different movements to be detected, different stroke lengths for the respective displacement sensors generally also arise. Accordingly, different embodiments of sensors have to be used. Similarly, the detection of different types of movement requires in each case different sensor types, such as, for example, for translatory and rotatory movements.

A further approach according to the prior art involves supplying the linear movement, which is to be sensed, of the shift shaft to the displacement sensor via a code path. For this purpose, sections of different heights are provided on the code path, with different heights corresponding to certain positions of the shift shaft. Said different heights are detected by a suitably arranged, linear displacement sensor.

The embodiments of the present invention provide an adjusting device for transmissions, in which positional changes caused by translatory and by rotatory movements can be detected with little outlay.

The adjusting device according to the invention improves on the prior art at least in that the sections of the code path of different heights are arranged at least two-dimensionally. Thus, given a suitable configuration of the two-dimensional code path, two movement directions which are independent of each other and the instantaneous position of the adjusting element in respect of two independent movement directions can be detected by just one sensor. In this case, for unambiguous detection, each discrete position to be detected can be assigned an unambiguous height on the two-dimensional code path. As an alternative, however, a plurality of positions of identical height may also be coded so as to form a group of positions which is to be treated identically in terms of control. If the sensor has a scanning element, the movement characteristics thereof can be matched to the characteristics of the sensor via an appropriate design of the code path sections; in particular, a rotational movement for angular detection can be converted into a linear movement. At least in some cases, this enables the number of different sensor types in an adjusting device to be reduced. The code path may also be arranged on curved surfaces, for example on shafts, thus resulting overall in a three-dimensional arrangement. For this reason, the wording "at least two-dimensionally" has been used in the present description.

In a preferred exemplary embodiment, it is provided that the adjusting element can execute both a translational movement and a rotational movement, with both an angular measurement and a linear displacement measurement taking place via the sensor. Such a combined detection of a linear displacement measurement and an angle size by a single sensor reduces the complexity of the adjusting device both in respect of the number of sensors and in respect of the outlay on evaluation.

Furthermore, it can advantageously be provided that the code path is coupled mechanically to the adjusting element or is arranged thereon. The sensor can thus detect the mechanical movement of the adjusting element, which movement is transmitted to the code path. For example, the code path may also be integrated directly into the shape of the adjusting element. This constitutes an only insignificantly higher outlay on construction and production.

In particular, an advantageous embodiment is produced in that the code path is provided to be arranged at least in some sections in an oil chamber of a transmission. This is advantageous in many cases, since the adjusting elements to be monitored are located there.

Furthermore, the invention can be advantageously implemented by the exemplary sensor being provided to be arranged at least in some sections outside an oil chamber of a transmission. The sensor can therefore be fitted outside an environment which is unfavorable for it, and therefore a more cost-effective construction form and/or a construction form having greater reliability can be selected for the sensor. For example, the sensor may be integrated into the cover of a transmission. Only the lower side of the sensor is therefore in contact with the oil chamber and exposed to the corresponding high loadings therein.

A further exemplary embodiment is developed in that a plurality of sensors is provided, the sensors being arranged at least essentially parallel to one another. The parallel orientation of a plurality of sensors makes it easier structurally to electrically connect the sensors, and simplifies the installation thereof.

In particular, the invention can preferably be implemented such that the angular positions of a selector lever and of a shift lever and the position of at least one shift fork of the transmission are detected with the plurality of sensors. All of the position information necessary for controlling the transmission can be detected in this manner.

Furthermore, it is advantageous in particular that the plurality of sensors is assigned a plurality of at least similar evaluation circuits. The use of at least similar evaluation circuits numbering as few as possible—in the ideal case only one common evaluation circuit-results in a significant reduction in costs.

In an advantageous embodiment, it can be provided that the code path is a cam path at least in some sections. This permits, for example, a direct activation of the sensor and therefore a direct transmission of the movement to be detected.

As an alternative, the invention can advantageously be implemented by the code path being designed at least in some sections as a stepless code path. This is advantageous in particular for use in automatic shift transmissions. In this case, for example, a stepless cam path for a shifting and selection movement can be arranged directly on the shift shaft which executes a rotational and a linear movement. Although the position is then not unambiguous, since only the shift cylinder or only the gate cylinder is activated, the electronic control system can assign the position unambiguously.

An advantageous exemplary embodiment also can be produced in that the sections of different heights are scanned mechanically by a scanning element coupled to the sensor. This constitutes a robust constructional type which can be produced in a simple manner.

In a likewise advantageous embodiment, it is provided that the sensor has a moveable sensor element which is coupled mechanically to the scanning element and is formed integrally therewith. A movement of the sensor element leads here to a changing output signal of the sensor. The use of a separate scanning element, for example in the form of a finger, therefore permits greater freedom of design in terms of fitting the sensor.

In another exemplary preferred embodiment, it is provided that the scanning element is prestressed in the direction of the cam path. As a result, the scanning element is in continuous mechanical contact with the cam path. The sensor can therefore reliably detect the instantaneous position or a change in position, which takes place at a particular instant, of the adjusting element.

It can likewise be provided that a plurality of sensors is assigned a corresponding plurality of cam paths having sections of different heights and a corresponding plurality of scanning elements, with the cam paths being designed in such a manner that comparable stroke movements arise for the scanning elements. On account of the comparable stroke movements, identical sensors can therefore be used despite the different movements carried out by the adjusting elements, which advantageously reduces the number of different components within the adjusting device.

A further advantageous exemplary embodiment arises in that the cam path forms at least one catch. Given an appropriate configuration of the sensor or of its elements, this permits a combination of the functions "latching" and "sensing". In particular, latching positions can be provided at different heights on different sections of the cam path. In this case, the corresponding position of the adjusting element can be detected in the particular latching position.

In particular, it can advantageously be provided here that the scanning element simultaneously forms a latching element. The effect achieved by the scanning element carrying out the latching function is a substantial merging of latching and sensor functions and a reduction in the number of components.

Another advantageous embodiment makes provision for the sensor to be an inductive displacement sensor. Inductive displacement sensors are suitable in particular for use in environments with a high temperature and/or media loading and can detect both translational and rotational movements by using the cam path.

Furthermore, it can advantageously be provided that the sections of different heights are scanned contactlessly by the sensor. Such a complete mechanical decoupling may be advantageous under certain environmental conditions, such as, for example, during particularly great temperature fluctuations or in the event of severe vibrations.

In this connection, it can be provided, for example, that the sensor is a Hall sensor.

According to exemplary embodiments of the invention, a system is provided for detecting two independent movement directions by one sensor with the aid of a two-dimensional code path. This firstly makes it possible to reduce the number of sensors and secondly permits a simple detection of linear and of rotational movements.

Further refinements and special features of the invention are set forth in the following description of preferred embodiments.

BRIEF DESCRIPTION OF THE DRAWINGS

The invention is explained by way of an example, using preferred embodiments and with reference to the accompanying drawings, in which.

DETAILED DESCRIPTION OF THE DRAWINGS

The same reference numbers refer to identical or comparable components in the description below of the drawings.

The embodiments illustrated here of the adjusting device according to an exemplary embodiment of the invention are provided for a three-speed or four-speed main transmission with a reverse gear. Transmissions of a higher or a lower number or else groups of transmissions and combinations of transmissions can be provided by the device according to the invention. Furthermore, in this context, the term "transmission" is, in particular, also to include clutches, parts thereof, and other adjustable elements.

Figure 1:
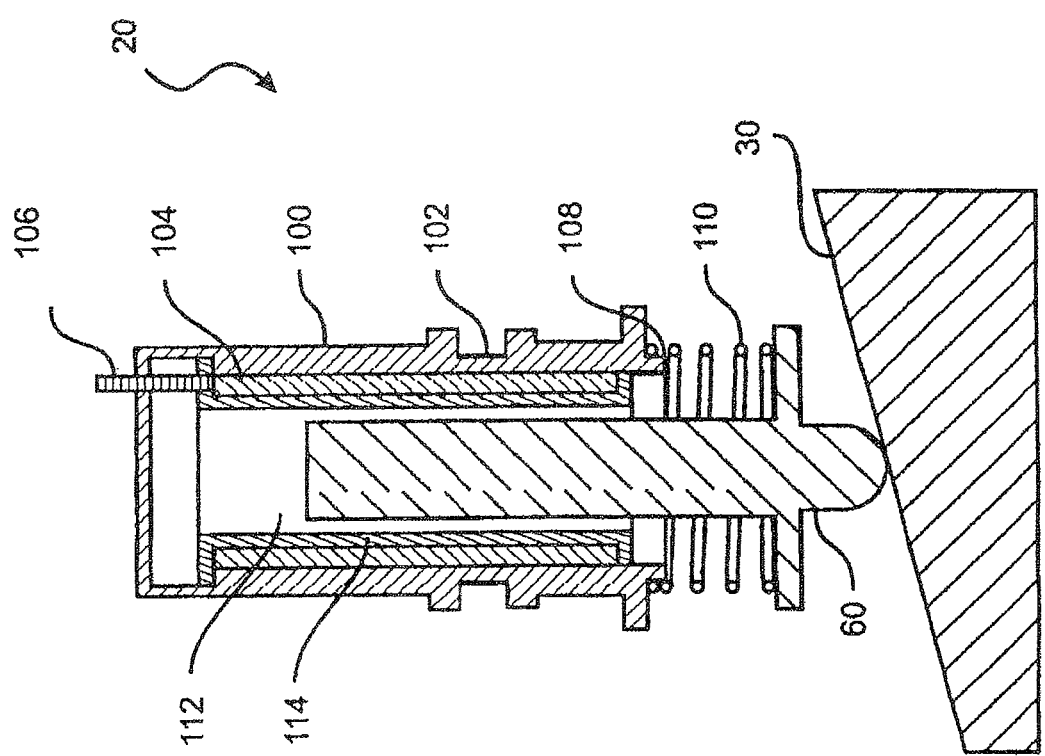
FIG. 1 shows a sectional view of a sensor which is usable according to an embodiment of the invention with a scanning element and cam path.

FIG. 1 shows a sectional view of an exemplary sensor 20 with a scanning element 60 and cam path 30. First of all, the basic construction and the operation of a sensor operating with a cam path is to be explained. The sensor 20 has a cylindrical housing 100 which is provided with an encircling fastening groove 102. A coil 104 is arranged within the housing. The coil 104 is connected to a signal line 106 which leads out of the housing 100. The scanning element 60 which extends along the axis of symmetry of the sensor 20 and in this case forms the moveable sensor element is located within the coil 104. The scanning element 60 protrudes out of the housing 100 at the opening 108 thereof and is coupled mechanically to said housing by a spring 110. The spring 110 prestresses the scanning element 60 against a cam path 30 and thus exerts a compressive force on the scanning element 60, pressing the latter away from the housing 100 of the sensor 20 and towards the cam path 30. The coil 104 of the sensor 20 is delimited in relation to the internal space 112 of the sensor 20 and therefore also with respect to the scanning element 60 by a sheathing 114. The housing 100 of the sensor 20 is connected, for example in a positionally fixed manner, to a housing of a transmission (not illustrated) via the circumferential groove 102, and the cam path 30 can be connected in a positionally fixed manner to an adjusting element (not depicted) which is to be sensed. Exemplary embodiments to this effect are illustrated below in FIGS. 2 and 4 and explained in the description with respect thereto.

The cam path 30 which is connected to a moving adjusting element moves relative to the housing 100 of the sensor 20 during a corresponding change in position of the adjusting element. On account of the mechanical coupling of the scanning element 60 to the cam path 30 via the spring 110, the scanning element 60 remains in continuous contact with the cam path 30. The changing height of the cam path 30 relative to the lower edge 108 of the housing 100 brings about a movement of the scanning element 60 within the interior 112 of the sensor 20. In this case, electric pulses are generated in the induction coil 104 of the sensor 20 and can be supplied via the electric signal line 106 to a suitable evaluation circuit (not depicted here) where they can be processed.

Figure 2:
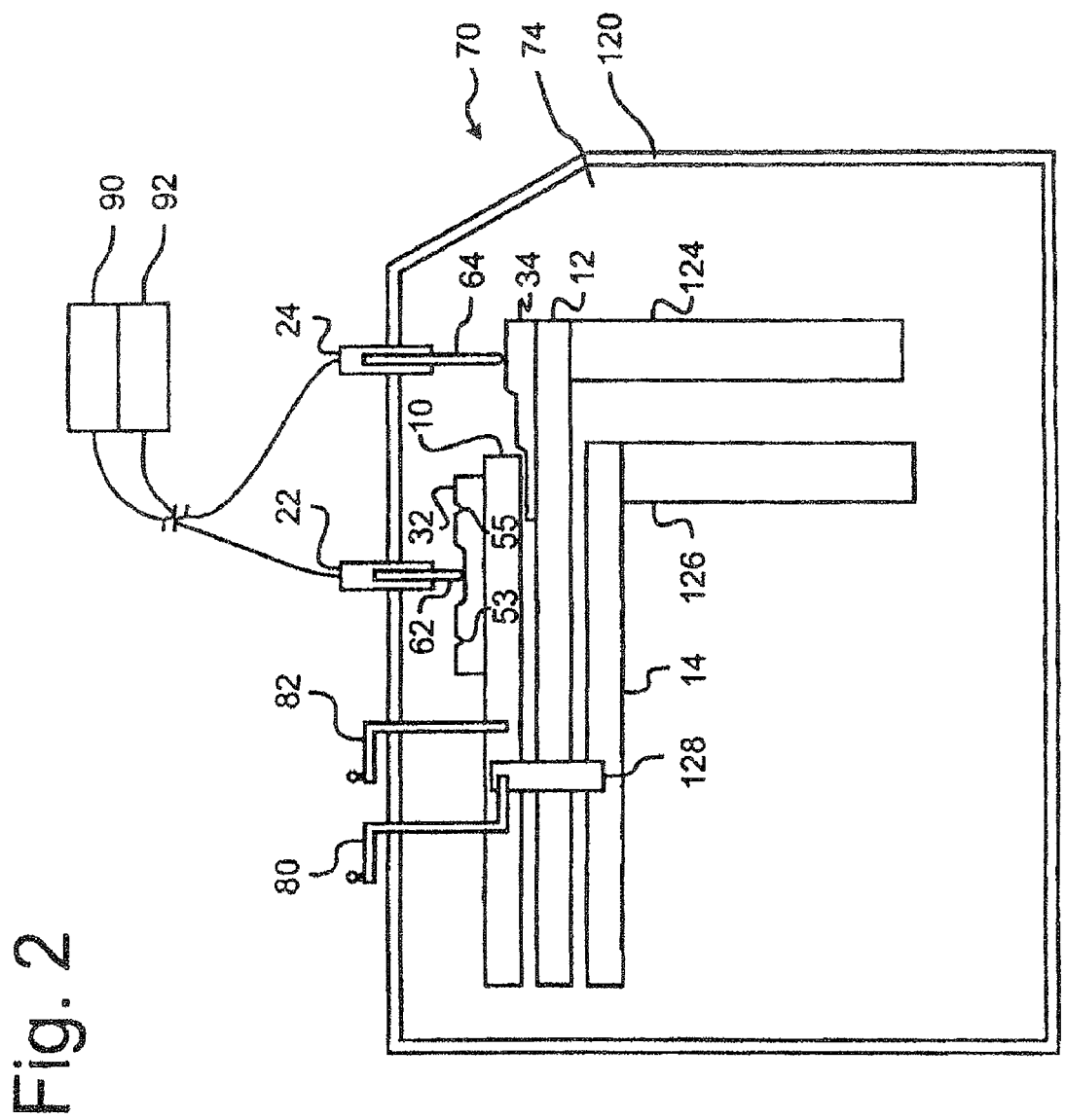
FIG. 2 shows a sectional view of an embodiment of the adjusting device according to the invention, installed in a transmission.

FIG. 2 shows a sectional view of an exemplary embodiment according to the invention of the adjusting device, installed in a transmission. This schematic illustration shows parts of a transmission 70. Parts which are not of specific interest here for the illustration and explanation, such as, for example, gear wheels, drive shafts, etc. have been omitted for reasons concerned with clarity. Two shift rods 12, 14 with the associated shift forks 124, 126 are illustrated within the housing of the three-speed main transmission 70 with a reverse gear. Furthermore, an adjusting device, comprising an adjusting element 10, selector lever 80, shift lever 82 and an actuating element 128, is depicted. Two inductive displacement sensors 22, 24 are integrated vertically into the housing of the transmission controller. The sensors 22, 24 correspond in their construction to the sensor 20 described with reference to FIG. 1 and illustrated there. The scanning elements 62, 64 of the sensors 22, 24 are in mechanical contact with the corresponding cam paths 32, 34. In this case, the first cam path 32 is arranged on the adjusting element 10, is designed as a two-dimensional cam path and is provided with latching sections 53, 55. The moveable sensor element of the induction sensor 22, which sensor element forms a scanning element 62, scans the cam path 32 and engages in the latching sections 53, 55 when correspondingly positioned. The second cam path 34 is provided on the shift rod 12. The sensors 22, 24 are connected to corresponding evaluation circuits 90, 92 via signal lines.

The information about the selection and shifting direction, which information is required for the shifting of the transmission 70, is passed to the transmission 70 via a movement of the selector lever 80 or of the shift lever 82. The selector lever 80 sets the adjusting element 10 into a rotational movement about its longitudinal axis via a correspondingly designed mechanism, in particular via the actuating element 128, therefore produces a mechanical coupling between the adjusting element 10 and the shift rod 12, 14 to be selected and releases the corresponding other shift rod 12, 14. By contrast, during a shifting movement, the shift lever 82 sets the adjusting element 10 into a linear movement along its longitudinal axis, the adjusting element, in the process, entraining a shift rod 12, 14 which is correspondingly coupled to the adjusting element 10. The corresponding released shift rod 12, 14 is not moved. In this manner, those parts (not illustrated) of the transmission 70 that are coupled to the shift forks 124, 126 can be engaged in the force flux or removed therefrom. The rotational and translational movements carried out by the adjusting element 10 are transmitted via the two-dimensional cam path 32 to the scanning element 62 of the sensor 22.

Figure 3:
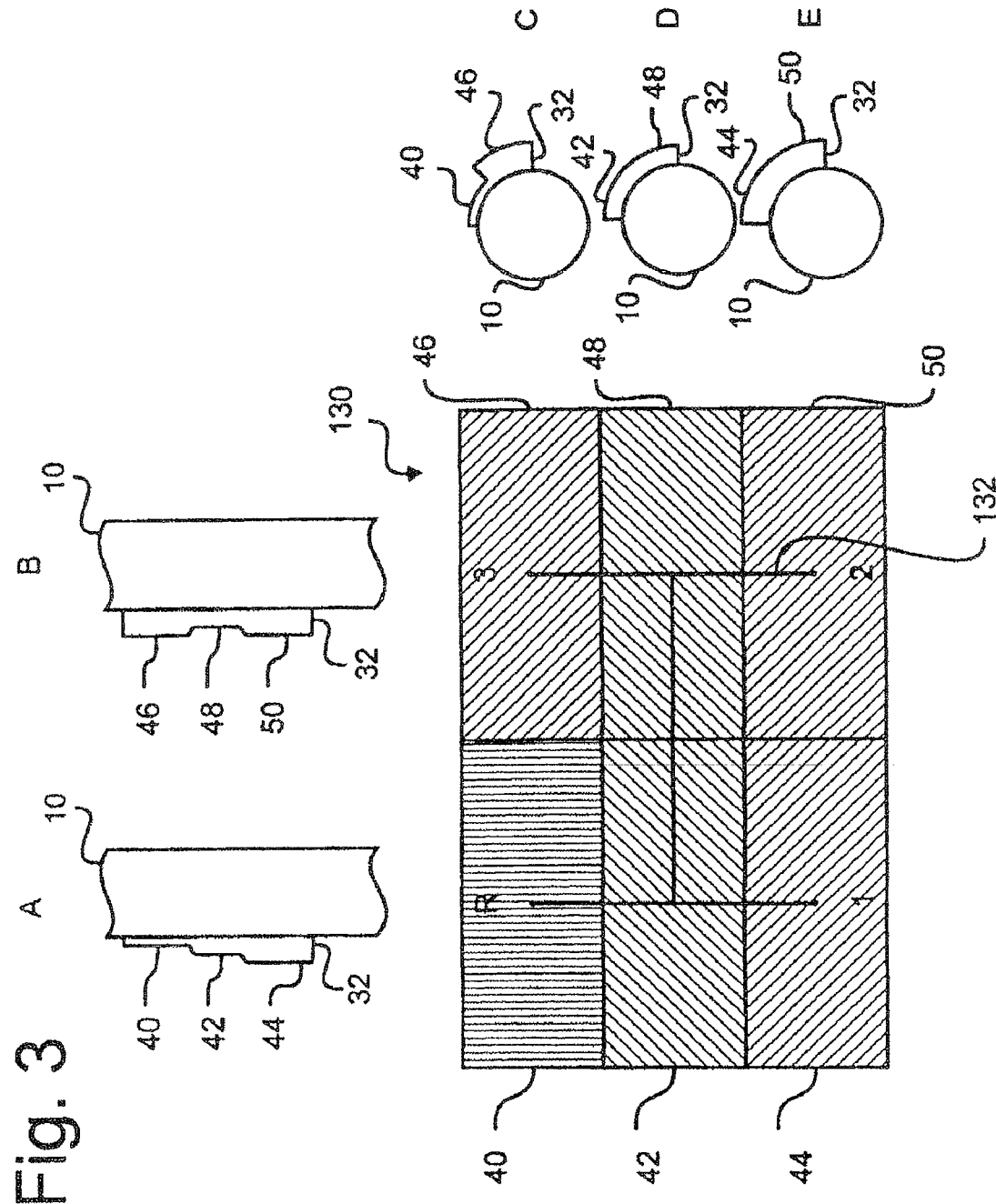
FIG. 3 shows multiple sectional views of a cam path and a schematic illustration of the same, according to an embodiment of the invention.

A detailed illustration of the cam path 32 and its functionality can be found in FIG. 3 and in the associated description. The positions corresponding in each case to an end position of the shift rod 10 are provided with latching depressions 53, 55. In this exemplary illustration, two latching sections 53, 55 are illustrated by way of example, but also more latching positions can be provided. The prestressing of the latching and sensor element 62 in the direction of the adjusting element 10 enables it to engage in the latching sections 53, 55 and thus to secure the adjusting element 10 in the respective position.

The change in inductance, which is caused by the scanning and sensor element 62, within the sensor 22 is transmitted as an electric measurement signal via a corresponding signal line to the evaluation circuit 90 and evaluated there. The instantaneous position of the adjusting element 10 can thereby be recognized with the aid of the correspondingly designed cam path 32 and just one assigned sensor 22. The positions of the shift rod 12 can be detected in a similar manner. The latter can take up three positions. This is reflected in three heights of the cam path 34, which heights correspond to a neutral position and two end positions. During changes of position, the scanning pin 64 transmits the changed height as a measurement signal via a signal line to the evaluation circuit 92. The evaluation circuits 90, 92 can be of essentially identical design, since the changes in height of the corresponding cam paths can be designed in a similar manner. Since, under some circumstances, the two-dimensional cam path 32 requires a greater number of heights or a more precise differentiation between the heights, two similar evaluation circuits 90, 92 are provided in this exemplary embodiment. The sensors 22, 24, because they are integrated vertically into the transmission cover, are removed essentially from the lower internal space 74 of the transmission. Only the lower side of the sensors 22, 24 and the scanning elements 62, 64 protrude into the oil chamber 74.

FIG. 3 shows sectional views of a cam path and a schematic illustration of the same. The illustrated longitudinal sections A, B run along the longitudinal axis of the adjusting element 10 of FIG. 2, the cross sections C, D, E run perpendicularly to the longitudinal axis of the adjusting element 10. In this figure, the illustration of the latching sections has been omitted for reasons concerned with clarity. The sectional views and the "developed view" 130 of the cam path 32 and the shift scheme 132, which is placed over it, of the three-speed main transmission with a reverse gear and with two shift rods illustrate the construction and functionality of the cam path 32, in particular the shifting states arising from the movements of the adjusting element 10, and the correspondingly assigned heights of the cam path 32.

The "developed view" 130 of the cam path 32 shows nine fields 40-50. Said fields 40-50 correspond to sections of the cam path 32, with the different hatchings indicating the different heights of the individual sections 40-50. The "developed view" 130 is oriented in such a manner that the longitudinal axis of the adjusting element 10 runs perpendicularly, as also illustrated in the longitudinal sections A, B. The shift scheme 132, which is placed over it, indicates which field 40-50 of the cam path 32 enters into contact with the scanning element 32 at corresponding positions of the selector and shift levers 80, 82. The elements 44, 46, 50 which are assigned the forward gears have a greatest height, the elements 42, 48 which represent neutral positions of the transmission have a medium height and the field 40 which is assigned to an engaged reverse gear has a lowest height. A movement which takes place in the vertical direction, i.e., for example, from a field 50 via a field 48 to field 46, corresponds to a movement of the adjusting element 10 along its longitudinal axis and therefore to a shifting movement. A movement in the horizontal direction, for example from field 42 to field 48, corresponds to a rotation of the adjusting element 10 about its longitudinal axis, i.e. to a selection movement.

The longitudinal sections A, B show the height profile of the cam path 32 as scanned by the scanning element 62 of the sensor 22 of FIG. 2 during different rotational positions of the adjusting element 10. In this case, the profile of the cam path 32 of the cross-sectional view A shows the height profile during a change of gear speed which takes place from first gear to reverse gear R or vice versa. In an analogous manner, the cross-sectional view B shows the height profile of the cam path 32 during a change of gear speed from second gear to third gear or vice versa. By contrast, the sectional views C, D, E show cross sections perpendicular to the longitudinal axis of the adjusting element 10. The sectional view C shows the height ratios of the cam path 32 that prevail between the field 40 corresponding to reverse gear R and the field 46 corresponding to the forward third gear. The sectional view D shows that there is a uniform medium height on the cam path 32 in the neutral positions of the fields 42 and 48. The sectional view E in turn shows the greatest height in the cam path 32, which is present on fields 44 and 50 which both correspond in each case to the engaged forward first and second gears.

During a movement of the adjusting element 10 along its longitudinal axis, which is caused by a corresponding movement of the shift lever 82, the scanning element 62 of the sensor 22 scans the cam path 32. In this case, the scanning element can either move along the fields 46, 48, 50 and can therefore constitute a change of gear speed between second gear and third gear. As an alternative, it can move between the fields 40, 42, 48 and can therefore depict a change of gear speed between reverse gear R and forward first gear. During the first-mentioned movement, the scanning element can differentiate the forward second and third gears from the neutral position which corresponds to the field 48. During the second movement mentioned, the reverse gear R, the neutral position and the forward gear can be sensed on account of the differently allocated heights. The change between the two neutral positions, which are coded by fields 42 and 48, does not need to be differentiated in this embodiment.

Of course, the illustrated H-shift scheme with four end positions is just one exemplary embodiment. More complex adjusting devices with a plurality of shift rods to be selected or an adjusting device with just one shift rod may also be controlled in this manner. Furthermore, the restriction implemented here to three heights which correspond to a reverse gear, the neutral positions and the forward gears is likewise arbitrary. According to the invention, each position to be taken up can be allocated an individual height. Under some circumstances, it is even possible, given appropriate fine scanning of the cam path, to scan a substantially larger number of intermediate positions.

Figure 4:
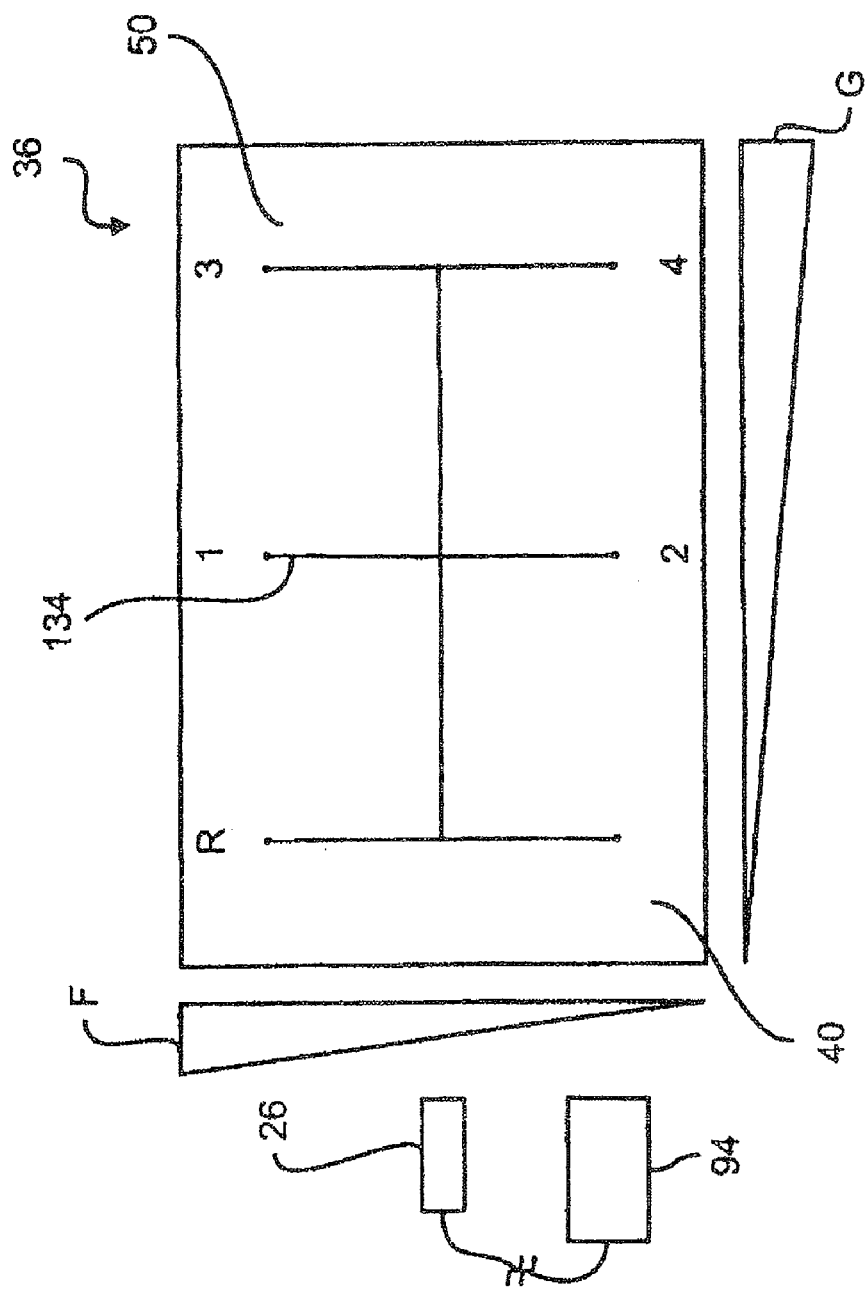
FIG. 4 shows a schematic illustration of a stepless code path.

FIG. 4 shows a schematic illustration of a stepless code path 36 according to the invention. According to the present exemplary embodiment, the code path 36 is designed for detecting a rotational and a linear movement and is provided for an automated shift transmission. The code path 36 can be arranged, for example, directly on the shift shaft (not depicted) which carries out the rotational and the linear movement. The illustration reproduces the "developed view" of the code path 36 analogous to FIG. 3. The shift transmission is indicated here by way of example by a shift scheme 134 with five end positions. The code path 36 is distinguished in particular by a stepless profile, i.e. although the individual positions to be detected are coded by certain heights 40, 50, no regions of identical height exist in the shifting or selection direction. This fact is clarified by sectional illustrations F, G. The sectional illustration F oriented in the shifting direction illustrates the rising profile of the code path 36 in the shifting direction, and the sectional illustration G which is oriented in the selection direction shows the same in the selection direction. Furthermore, a contactless sensor, here by way of example a Hall sensor 26, with an electronic evaluation system 94 is illustrated schematically in FIG. 4 as an alternative to the scanning methods explained in the description above. Of course, the abovementioned scanning methods may also be used here. The Hall sensor detects the height profile of the code path 36 both in the shifting direction and in the selection direction and is illustrated here for clarification purposes in conjunction with the rising profile F of the code path 36 in the shifting direction.

During a shifting or selection operation, the exemplary code path 36 executes a linear or rotational movement by using the shift shaft. The associated change in distance between the code path 36 and the Hall sensor 26 is passed on in the form of an electric pulse by the Hall sensor 26 to the electronic evaluation system 94. In this case, the movement of the code path 36 is initially not coded unambiguously, i.e. the information detected and passed on by the Hall sensor 26 primarily does not permit an unambiguous conclusion in respect of the type of movement which has taken place (selection or shifting movement). However, since only either the shift cylinder or the gate cylinder is activated, the electronic control and evaluation system 94 can unambiguously assign the position.

The features of the invention which are disclosed in the above description, in the drawings and in the claims may be essential both individually and in any desired combination in order to realize the invention.

The following list of reference numbers is provided to simplify understanding of the present specification and claims:
10 Adjusting element
12 First shift rod
14 Second shift rod
20 Induction sensor
22 Sensor for a two-dimensional cam path
24 Sensor for a one-dimensional cam path
26 Hall sensor for a two-dimensional code path
30 Cam path
32 Two-dimensional cam path
34 One-dimensional cam path
36 Two-dimensional code path
40 Cam path section, low height
42 Cam path section, medium height
44 Cam path section, great height
46 Cam path section, great height
48 Cam path section, medium height
50 Cam path section, great height
53, 55 Latching sections
60 Scanning element 62 Scanning element for the two-dimensional cam path
64 Scanning element for the one-dimensional cam path
70 Transmission
74 Oil chamber
80 Selector lever
82 Shift lever
90 Evaluation circuit
92 Evaluation circuit
94 Evaluation circuit
100 Housing
102 Encircling groove
104 Coil
106 Electric connections
108 Housing opening
110 Spring
112 Internal space
114 Sheathing
120 Transmission housing
124 First shift fork
126 Second shift fork
128 Actuating device
132 Shift scheme
134 Shift scheme
A, B Longitudinal section along the longitudinal axis of the adjusting element 10
C, D, E Cross sections perpendicular to the longitudinal axis of the adjusting element 10
F Sectional illustrations of the code path 36 in the shifting direction
G Sectional illustrations of the code path 36 in the selection direction The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An adjusting device for a transmission, comprising:
    at least one moveable adjusting element:
    at least two sensors, each for detecting a position of a corresponding one of the at least one moveable adjusting element; and
    a code path on each of the at least one moveable adjusting element, having sections of different heights which are provided to be scanned by a corresponding one of the at least two sensors, the sections of the code path of different heights being arranged at least two-dimensionally to vary in directions perpendicular to one another,
    wherein the at least two sensors are arranged parallel to one another.

2. The adjusting device as claimed in claim 1, wherein the at least one adjusting element is adapted to execute a translational and a rotational movement, thereby both an angular measurement and a linear displacement measurement taking place via the corresponding one of the at least two sensors.

3. The adjusting device as claimed in claim 1, wherein the code path is one of coupled mechanically to the at least one adjusting element and arranged thereon.

4. The adjusting device as claimed in claim 1, wherein at least some sections of the code path are disposed in an oil chamber of the transmission.

5. The adjusting device as claimed claim 1, wherein at least some sections of the at least two sensors are provided to be arranged outside an oil chamber of the transmission.

6. The adjusting device as claimed in claim 2, wherein the angular positions of a selector lever and of a shift lever and the position of at least one shift fork of the transmission are detected with the at least two sensors.

7. The adjusting device as claimed in claim 1, wherein the at least two sensors are assigned a plurality of at least similar evaluation circuits.

8. The adjusting device as claimed in claim 1, wherein at least some sections of the code path comprise a cam path.

9. The adjusting device as claimed in claim 1, wherein at least some sections of the code path comprise a stepless code path.

10. The adjusting device as claimed in claim 1, wherein the sections of different heights are scanned mechanically by a scanning element coupled to each of the at least two sensors.

11. The adjusting device as claimed in claim 10, wherein the at least two sensors have a moveable sensor element which is at least one of coupled mechanically to and formed integrally with the scanning element.

12. The adjusting device as claimed in claim 10, wherein the scanning element is prestressed in the direction of the cam path.

13. The adjusting device as claimed in claim 10, wherein the at least two sensors are assigned a corresponding plurality of cam paths having sections of different heights, and a corresponding plurality of scanning elements, the plurality of cam paths being designed to produce comparable stroke movements for the scanning elements.

14. The adjusting device as claimed in claim 10, wherein the cam path forms at least one catch.

15. The adjusting device as claimed in claim 10, wherein the scanning element simultaneously forms a latching element.

16. The adjusting device as claimed in claim 1, wherein the at least two sensors is an inductive displacement sensor.

17. The adjusting device as claimed in claim 1, wherein the sections of different heights are scanned without contact by the at least two sensors.

18. The adjusting device as claimed in claim 17, wherein the at least two sensor comprise a Hall sensor.

19. The adjusting device as claimed in claim 1, wherein the transmission is a motor vehicle transmission.

* * * * *